UNITED STATES PATENT OFFICE.

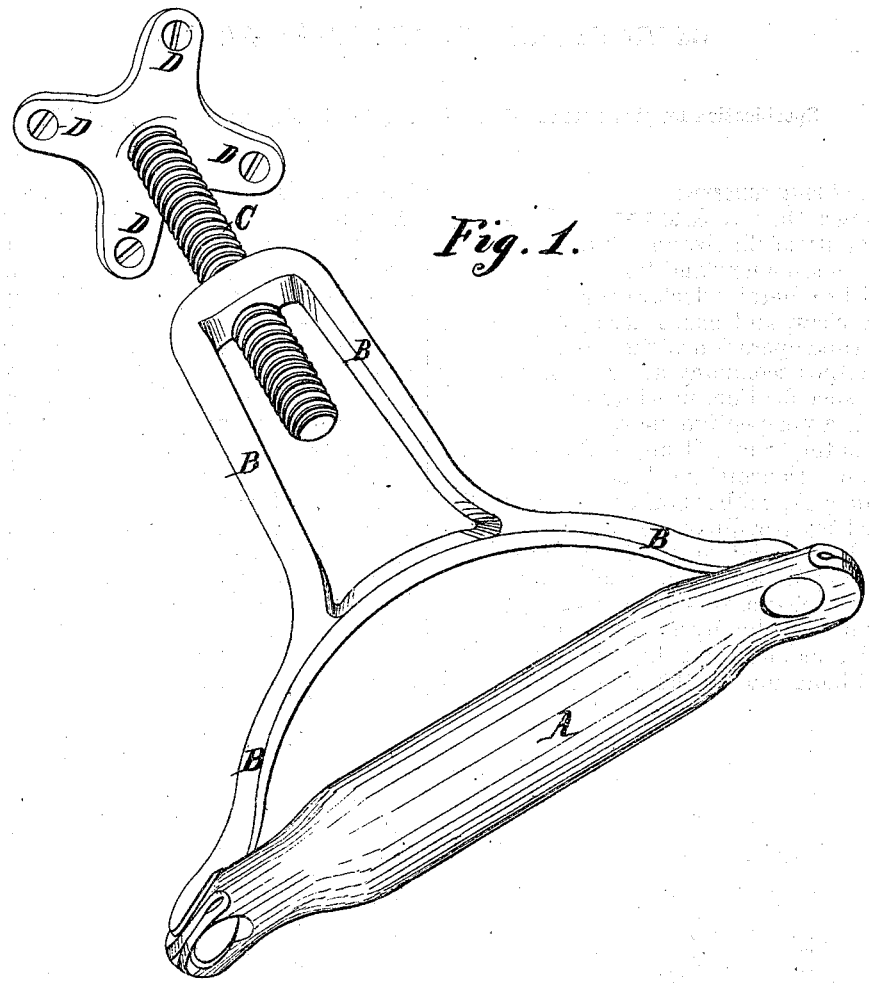

GEORGE H. HURD, OF MEMPHIS, TENNESSEE.

IMPROVEMENT IN TREADLE-BRACES.

Specification forming part of Letters Patent No. 120,648, dated November 7, 1871.

*To all whom it may concern:*

Be it known that I, GEORGE H. HURD, of Memphis, county of Shelby and State of Tennessee, have invented a new and Improved Treadle-Brace; and I do hereby declare that the following is a full, clear, and exact description of the construction and operation of the same, reference being had to the accompanying drawing making part of this specification, in which—

Figure 1 is a perspective view.

B B B B is the frame; C, adjustable screw; D D D D, screws securing the brace-screw to the table or stand; A, rubber spring or cushion.

I construct my treadle-brace of brass, iron, or other suitable material, to which I attach a rubber or other elastic spring or cushion, as shown in A, Fig. 1. I fasten this brace to the sewing-machine stand or table by means of screws D D D D in such a manner that the rubber spring or cushion will hang toward the treadle of the machine, the brace being placed in such a position that the rubber spring will rest upon the leg of the operator a short distance from the knee. The brace is made adjustable, by means of the screw C, to suit the convenience of the operator.

The object of this my invention is to facilitate the operating of sewing and other treadle-machines, and save the strain upon the system, by placing a brace in such a position as to cause the main strain upon the lower part of the leg and foot of the operator.

What I claim is—

The combination of the screw C, passing through the frame B B B B, and the rubber spring A, when constructed, arranged, and applied to a sewing-machine, as herein shown and described, for the purpose specified.

GEORGE H. HURD.

Witnesses:
JOHN G. VAUGHN,
W. L. INGRAM.

(67)